(12) United States Patent
Sanford

(10) Patent No.: US 6,595,020 B2
(45) Date of Patent: Jul. 22, 2003

(54) HYBRID POWERED EVAPORATIVE COOLER AND METHOD THEREFOR

(76) Inventor: David I. Sanford, 6620 N. 19th Ave., Phoenix, AZ (US) 85015-1639

( * ) Notice: Subject to any disclaimer, the term of this patent is extended or adjusted under 35 U.S.C. 154(b) by 0 days.

(21) Appl. No.: 09/953,551

(22) Filed: Sep. 17, 2001

(65) Prior Publication Data

US 2003/0051498 A1 Mar. 20, 2003

(51) Int. Cl.[7] .............. F28D 5/00; F25B 27/00; F24F 3/14; F02M 11/00; G11B 5/596
(52) U.S. Cl. ............... 62/314; 62/235.1; 165/60; 261/105; 261/147; 360/78.04
(58) Field of Search ............... 29/401.1; 62/235.1, 62/314; 165/60; 248/645; 261/29, 105, 147; 360/78.04

(56) References Cited

U.S. PATENT DOCUMENTS

| | | | |
|---|---|---|---|
| 3,583,174 A | | 6/1971 | Logue |
| 3,738,621 A | * | 6/1973 | Anderson .................. 261/105 |
| 4,281,515 A | * | 8/1981 | Ferriera .................... 62/235.1 |
| 4,361,525 A | * | 11/1982 | Leyland .................... 165/60 |
| 4,468,357 A | * | 8/1984 | Miller et al. ............... 261/29 |
| 4,604,874 A | * | 8/1986 | Seeley ....................... 248/645 |
| 4,612,778 A | * | 9/1986 | Medrano .................... 261/147 |
| 4,658,597 A | | 4/1987 | Shum |
| 5,042,270 A | * | 8/1991 | Sanchez .................... 261/29 |
| 5,373,703 A | * | 12/1994 | Pal ............................ 360/78.04 |
| 5,488,801 A | * | 2/1996 | Nix ........................... 29/401.1 |
| 5,493,155 A | | 2/1996 | Okamoto et al. |
| 5,560,218 A | | 10/1996 | Jang |
| 5,878,584 A | | 3/1999 | Sasaki et al. |
| 6,101,716 A | * | 8/2000 | Schulz ....................... 29/401.1 |
| 6,112,538 A | | 9/2000 | Strussion et al. |
| 6,134,902 A | | 10/2000 | Curry |
| 6,182,463 B1 | | 2/2001 | Strussion et al. |

\* cited by examiner

Primary Examiner—William C. Doerrler
Assistant Examiner—Filip Zec
(74) Attorney, Agent, or Firm—Jeffrey D. Moy; Harry M. Weiss; Weiss, Moy & Harris, P.C.

(57) ABSTRACT

An alternative powered evaporative cooler has a squirrel cage fan. A low voltage DC motor is provided to power the squirrel cage fan. A pulley system is coupled to the squirrel cage fan and the low voltage DC motor for transferring energy from the low voltage DC motor to rotate the squirrel cage fan. A low voltage DC power source is provided to power the low voltage DC motor.

17 Claims, 1 Drawing Sheet

HYBRID POWERED EVAPORATIVE COOLER AND METHOD THEREFOR

BACKGROUND OF THE INVENTION

1. Field of the Invention

This invention relates to cooling systems, and more specifically, to a hybrid powered evaporative cooler which is able to run off of a low voltage power supply such as that generated by a battery and/or solar panel.

2. Description of the Prior Art

Evaporative coolers are well known devices. Evaporative coolers operate by drawing air across water soaked pads. This process produces an air-water vapor mixture which has a temperature significantly below that of the outside air temperature. Evaporative coolers are very popular since they are much less expensive when compared with conventional space air conditioners. They are generally used to a high degree in the southwestern parts of the United States since they work best in areas where there is low humidity.

Evaporative coolers generally consist of a cube shaped housing with a blower inside the housing. The housing includes louver type openings which allow air to pass inside the housing when the blower is operated. Adjacent the louver openings, and inside the housing, are pads, which in use, are soaked with water. A water cooling system is provided inside the housing for soaking the pads, and for gathering and circulating the water within the water cooling system. A water pump, which is powered by electricity from an existing household line, is used to circulate the water. The motor for driving the blower is also powered from electricity from the same line.

Due to the present energy crisis, many people are looking for ways to conserve energy. Unfortunately, many people do not want to give up the comforts of an evaporative cooler to cool their home. Presently, there are no evaporative coolers which are able to run efficiently off of a low voltage power supply. Present evaporative coolers which claim to run off of an alternative power supply require the use of expensive and time consuming retrofit kits. Other evaporative coolers which run off of an alternative energy source are unable to rotate the motor at a sufficient enough speed to generate a substantial air flow.

Therefore a need existed to provide an improved evaporative cooler. The improved evaporative cooler must be able to operate efficiently off of a low voltage power source. The improved evaporative cooler must further be able to run off of an alternative energy source, such as a low voltage power source, while at the same time being able to generate a substantial air flow.

SUMMARY OF THE INVENTION

In accordance with one embodiment of the present invention, it is an object of the present invention to provide an improved evaporative cooler.

It is another object of the present invention to provide an improved evaporative cooler that is able to operate efficiently off of a low voltage power source.

It is still another object of the present invention to provide an improved evaporative cooler that is able to run off of an alternative energy source, such as a low voltage power source, while at the same time being able to generate a substantial air flow.

BRIEF DESCRIPTION OF THE PREFERRED EMBODIMENTS

In accordance with one embodiment of the present invention an alternative powered evaporative cooler is disclosed. The evaporative cooler has a squirrel cage fan. A low voltage DC motor is also provided. A pulley system is coupled to the squirrel cage fan and the low voltage DC motor for transferring energy from the low voltage DC motor to rotate the squirrel cage fan. A low voltage DC power source is provided to power the low voltage DC motor.

In accordance with another embodiment of the present invention an alternative powered evaporative cooler is disclosed. The evaporative cooler has a squirrel cage fan. A low voltage DC motor is used for rotating the squirrel cage fan. A pulley system is coupled to the squirrel cage fan and the low voltage DC motor for transferring energy from the low voltage DC motor to rotate the squirrel cage fan. A low voltage DC power source is provided for powering the low voltage DC motor. The evaporative cooler further has a cooler pad. A low voltage DC pump is coupled to the low voltage DC power source and is used for saturating the cooler pad with water. A housing is provided and is used to cover the evaporative cooler in order to protect the evaporative cooler from the environment. The housing has a plurality of louvers on at least one side for allowing the squirrel cage fan to draw air into the evaporative cooler.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

DETAILED DESCRIPTION OF THE PREFERRED EMBODIMENT

Figure 1:
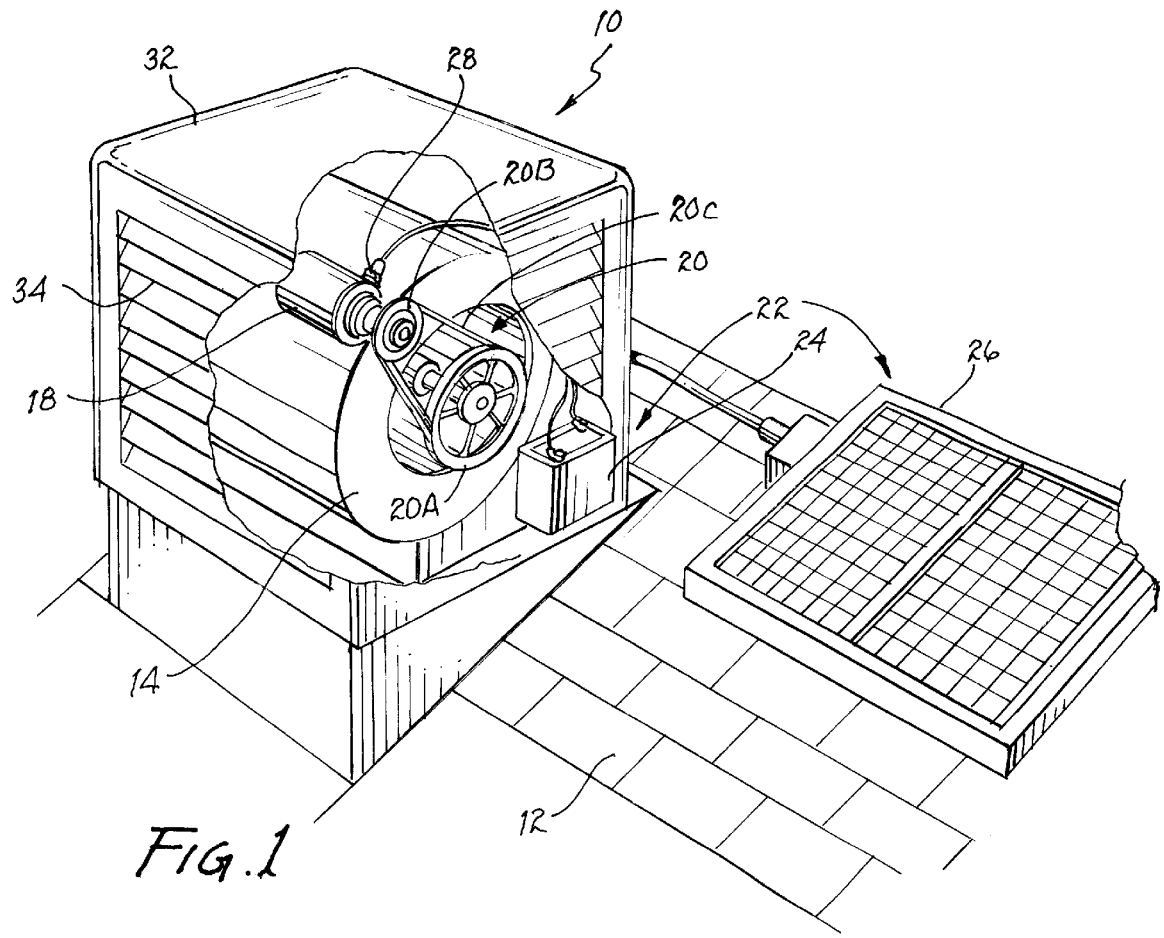
FIG. 1 is an elevated perspective view of the evaporative cooler of the present invention.
Figure 2:
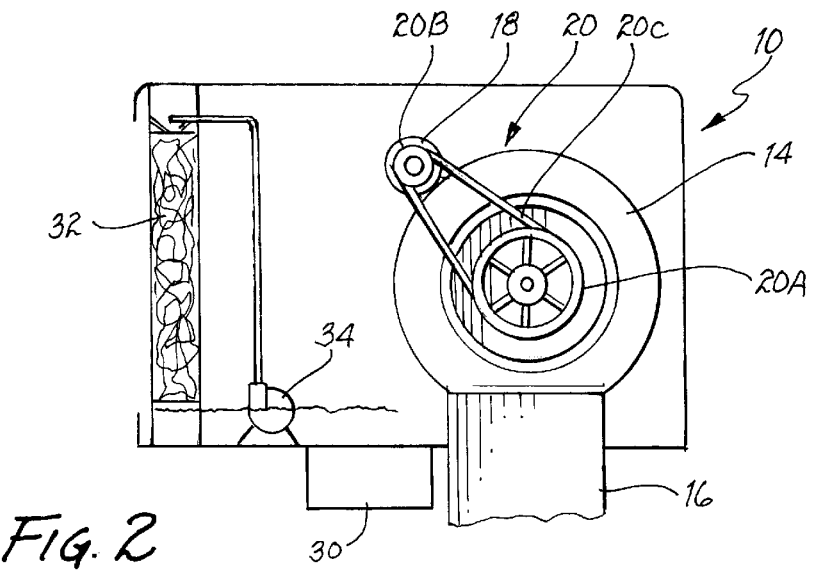
FIG. 2 is a side view of the evaporative cooler depicted in FIG. 1.

Referring now to the Figures, an evaporative cooler 10 (hereinafter cooler 10) of the present invention is shown. The cooler 10 has been designed so that it is able to operate in an efficient manner off of a low voltage power source.

The cooler 10 is generally mounted to a roof 12 or side wall of a building. The cooler 10 has a squirrel cage fan device 14. A squirrel cage fan 14 is used since in operation the squirrel cage fan 14 is able to compress air through the air ducting 16 unlike a conventional radial fan. The squirrel cage fan 14 is coupled to a motor 18 via a pulley system 20. The pulley system is important since inappropriate sized pulleys will not allow the squirrel cage fan 14 to rotate at a high enough speed to generate a sufficient air flow through the ducting 16.

The pulley system 20 is designed so that there is minimal amperage draw from the motor 18. This will allow a low voltage power source 22 to drive the motor 18, and hence the squirrel cage fan 14, in a manner that will produce a sufficient enough air flow through the ducting 16. The pulley system 20 has a first pulley 20A which is coupled to the squirrel cage fan 14. A second pulley 20B is coupled to the drive motor 18. The second pulley 20B is generally smaller than the first pulley 20A. In accordance with one embodiment of the present invention, the first pulley 20A was sized at approximately 7" while the second pulley 20B was sized at 2". It should be noted that these are used just as an example and should not be seen as to limit the scop of the present invention.

The first pulley 20A and the second pulley 20B are coupled together by a belt 20C. In general, the belt 20C is made of a rubberized material. The belt 20C is used to transfer torque from the motor 18 to the squirrel cage fan 14. This will enable the pulley system 20 to turn/rotate the squirrel cage fan 14. The belt 20C should be fairly taught to increase the efficiency of the cooler 10. If the belt 20C is loose, then there will be slippage in the pulley system 20 thereby making the cooler 10 less efficient.

As stated above, the second pulley 20B is coupled to the motor 18. The motor 18 is a low voltage DC motor. In accordance to one embodiment of the present invention, the motor 18 is a 12 VDC to 24 VDC motor. The motor 18 is coupled to a low voltage DC power source 22. The power source 22 may be a single source or multiple sources. Multiple power sources 22 may be used for redundancy. This will allow the cooler 10 to run off of different power sources 22 in case of a power source 22 failure. In the embodiment depicted in the Figures, one of the power source 22 is a battery 24. Alternatively, one of the power sources 22 may be a solar panel 26. Each of the power sources 22 is coupled to the motor 18. A switching device 28 may be used to select which power source 22 is used to power the motor 18.

The cooler 10 may also be powered by an AC power source. The cooler 10 has an AC to DC power converter 30. The converter 30 is used to convert an AC power source to DC power. The converted DC power is used to run the motor 18. In accordance with one embodiment of the present invention, the converter 30 is able to take 120 VAC and convert it to 13.8 VDC at 25 amps. The converter 30 is coupled to the switching device 28. Thus, a user of the cooler 10 is able to select the power source for the cooler 10.

The cooler 10 has a cooler pad 32. A pump 34 is used to place water onto the cooler pad 32. Thus, when the squirrel cage fan 14 rotates, a vacuum is created which draws air through the cooler pad 32. The water which is used to saturate the cooler pad 32 helps to cool the air which is drawn through the cooler pad 32. The drawn air is actually an air-water vapor mixture which has a temperature well below that of the outside air temperature. The squirrel cage fan 14 forces this air-water vapor mixture down the air ducting 16. The pump 34 is a low voltage pump. The low voltage pump 34 is powered by the same power source 22 which is used to power the squirrel cage fan 14. Thus, the pump 34 is generally coupled to the switching device 28 so that whatever power source 22 is selected will power the pump 34.

The cooler 10 is enclosed in a rectangular enclosure 32. The enclosure 32 is used to protect the cooler 10 from the environment. The enclosure 32 has a plurality of louvers 34 located on the side of the enclosure 32. The louvers 34 allow the cooler 10 to draw outside air into the cooler 10. In operation, when the squirrel cage fan 14 rotates, a vacuum is created which draws the outside air through the louvers 34 and through the cooler pad 32. The cooler pad 32 which is saturated with water helps to cool the air which is drawn through the cooler pad 32. The drawn air is actually an air-water vapor mixture which has a temperature well below that of the outside air temperature. The squirrel cage fan 14 forces this air-water vapor mixture down the air ducting 16.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An alternative powered evaporative cooler comprising, in combination:
    a squirrel cage fan;
    a low voltage DC motor;
    a pulley system coupled to the squirrel cage fan and the low voltage DC motor for transferring energy from the low voltage DC motor to rotate the squirrel cage fan;
    a low voltage DC power source;
    a cooler pad;
    a low voltage DC pump coupled to the low voltage DC power source for saturating the cooler pad with water; and
    an AC to DC converter coupled to the low voltage DC motor and to the low voltage DC pump for allowing the evaporative cooler to operate from an AC power source.

2. An alternative powered evaporative cooler in accordance with claim 1 further comprising a housing for protecting the evaporative cooler from the environment.

3. An alternative powered evaporative cooler in accordance with claim 1 wherein the housing has a plurality of louvers on at least one side of the housing for allowing the squirrel cage fan to draw air into the evaporative cooler.

4. An alternative powered evaporative cooler in accordance with claim 1 further comprising:
    a plurality of low voltage DC power sources; and
    a switching mechanism coupled to each of the plurality of low voltage DC power sources and to the low voltage DC motor and to the low voltage DC pump for selecting which of the plurality of low voltage DC power sources will be used.

5. An alternative powered evaporative cooler in accordance with claim 4 wherein one of the plurality of low voltage DC power sources is a battery.

6. An alternative powered evaporative cooler in accordance with claim 4 wherein one of the plurality of low voltage DC power sources is a solar panel.

7. An alternative powered evaporative cooler in accordance with claim 1 wherein the pulley system comprises:
    a first pulley coupled to the squirrel cage fan;
    a second pulley coupled to the low voltage DC motor; and
    a belt coupled to the first pulley and second pulley for transferring energy from the low voltage DC motor to rotate the squirrel cage fan.

8. An alternative powered evaporative cooler in accordance with claim 7 wherein the second pulley has a smaller diameter than the first pulley.

9. An alternative powered evaporative cooler in accordance with claim 7 wherein the first pulley has a diameter of approximately 7" and the second pulley has a diameter of approximately 2".

10. An alternative powered evaporative cooler comprising, in combination:
    a squirrel cage fan;
    a low voltage DC motor;
    a pulley system coupled to the squirrel cage fan and the low voltage DC motor for transferring energy from the low voltage DC motor to rotate the squirrel cage fan;

a low voltage DC power source for powering the low voltage DC motor;

a cooler pad;

a low voltage DC pump coupled to the low voltage DC power source for saturating the cooler pad with water;

a housing for protecting the evaporative cooler from the environment;

a plurality of louvers on at least one side of the housing for allowing the squirrel cage fan to draw air into the evaporative cooler;

a plurality of low voltage DC power sources; and a switching mechanism coupled to each of the plurality of low voltage DC power sources and to the low voltage DC motor and to the low voltage DC pump for selecting which of the plurality of low voltage DC power sources will be used.

11. An alternative powered evaporative cooler in accordance with claim 10 wherein one of the plurality of low voltage DC power sources is a battery.

12. An alternative powered evaporative cooler in accordance with claim 10 wherein one of the plurality of low voltage DC power sources is a solar panel.

13. An alternative powered evaporative cooler in accordance with claim 10 further comprising an AC to DC converter coupled to the low voltage DC motor and to the low voltage DC pump for allowing the evaporative cooler to operate from an AC power source.

14. An alternative powered evaporative cooler in accordance with claim 10 wherein the pulley system comprises:

a first pulley coupled to the squirrel cage fan;

a second pulley coupled to the low voltage DC motor; and a belt coupled to the first pulley and second pulley for transferring energy from the low voltage DC motor to rotate the squirrel cage fan.

15. An alternative powered evaporative cooler in accordance with claim 14 wherein the second pulley has a smaller diameter than the first pulley.

16. An alternative powered evaporative cooler in accordance with claim 14 wherein the first pulley has a diameter of approximately 7" and the second pulley has a diameter of approximately 2".

17. An alternative powered evaporative cooler comprising, in combination:

a squirrel cage fan;

a low voltage DC motor;

a pulley system coupled to the squirrel cage fan and the low voltage DC motor for transferring energy from the low voltage DC motor to rotate the squirrel cage fan;

a low voltage DC power source;

a plurality of low voltage DC power sources; and a switching mechanism coupled to each of the plurality of low voltage DC power sources and to the low voltage DC motor and to the low voltage DC pump for selecting which of the plurality of low voltage DC power sources will be used.

\* \* \* \* \*